D. T. SHARPLES.
MILKING APPARATUS.
APPLICATION FILED JUNE 6, 1910.
994,956.
Patented June 13, 1911.
3 SHEETS—SHEET 1.
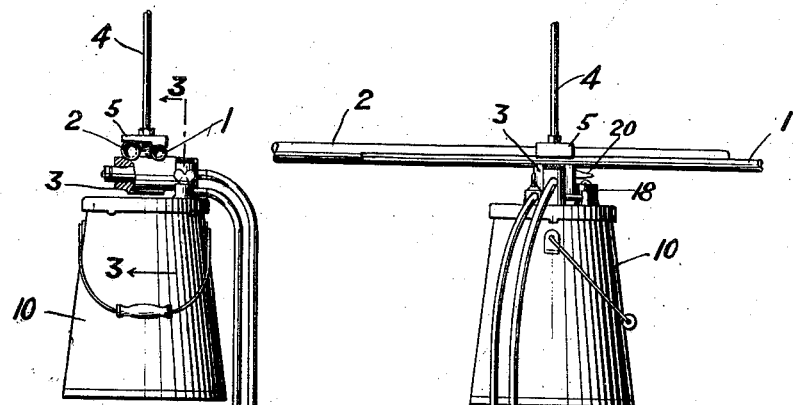
FIG.1.    FIG.2.
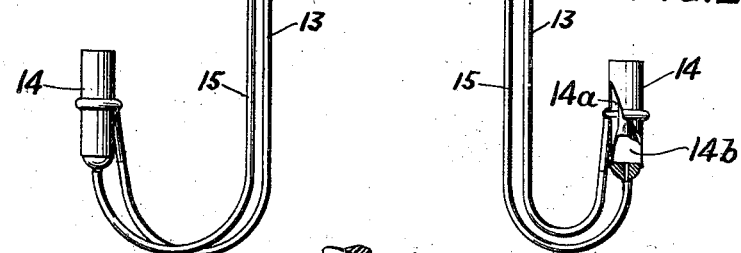
FIG.3.
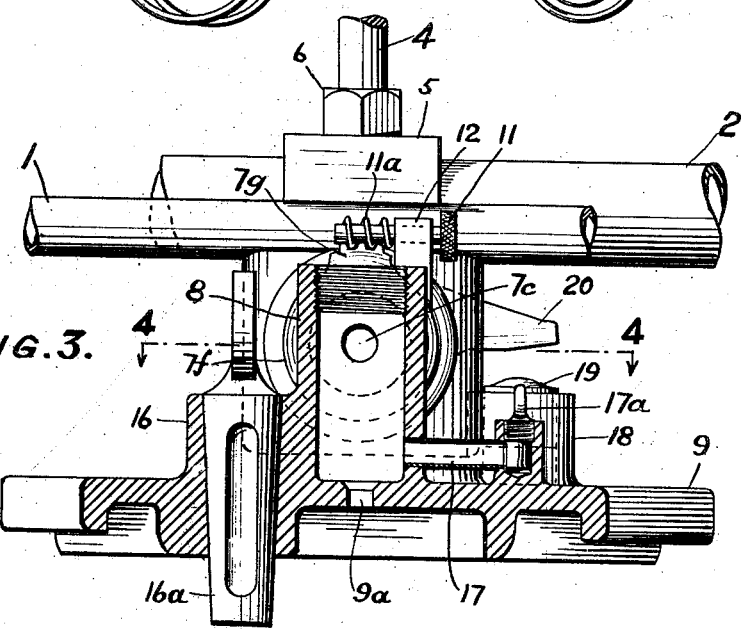
WITNESSES:
INVENTOR
David T. Sharples
BY
ATTORNEY.

D. T. SHARPLES.
MILKING APPARATUS.
APPLICATION FILED JUNE 6, 1910.
994,956.
Patented June 13, 1911.
3 SHEETS—SHEET 2.
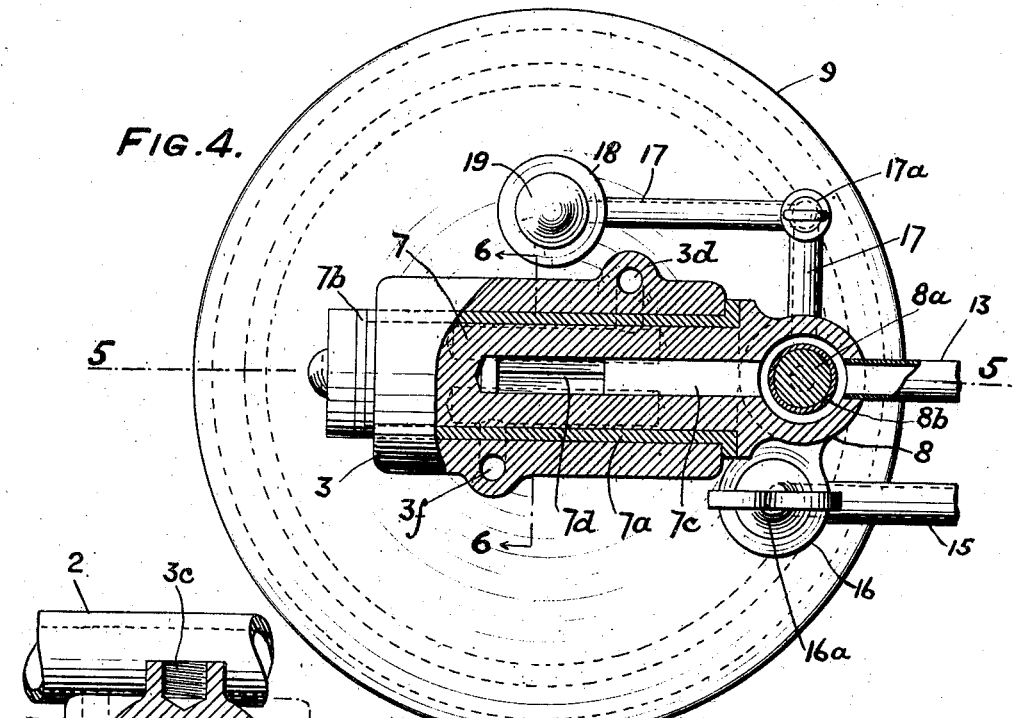
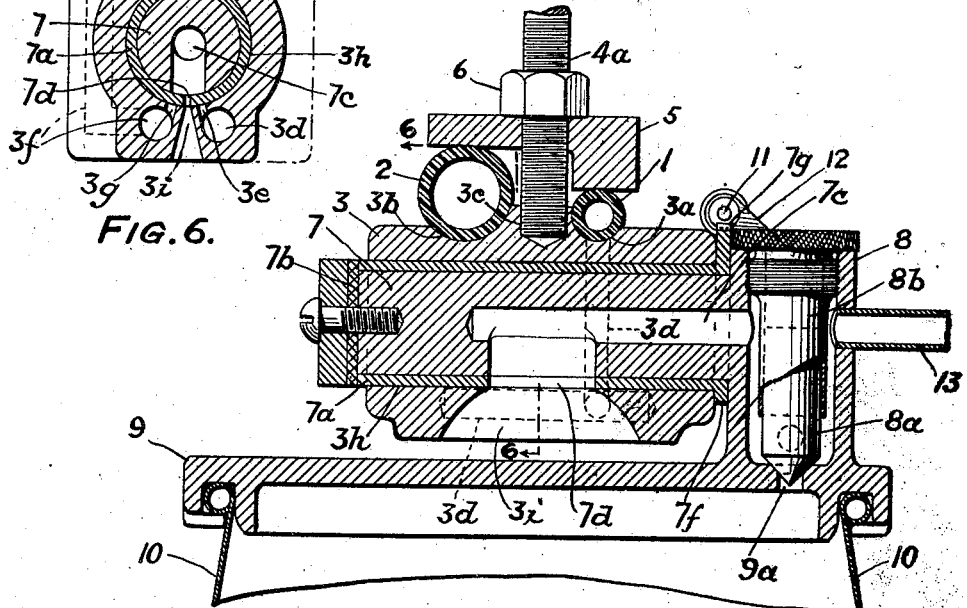
WITNESSES:
INVENTOR
David T. Sharples
BY
ATTORNEY.

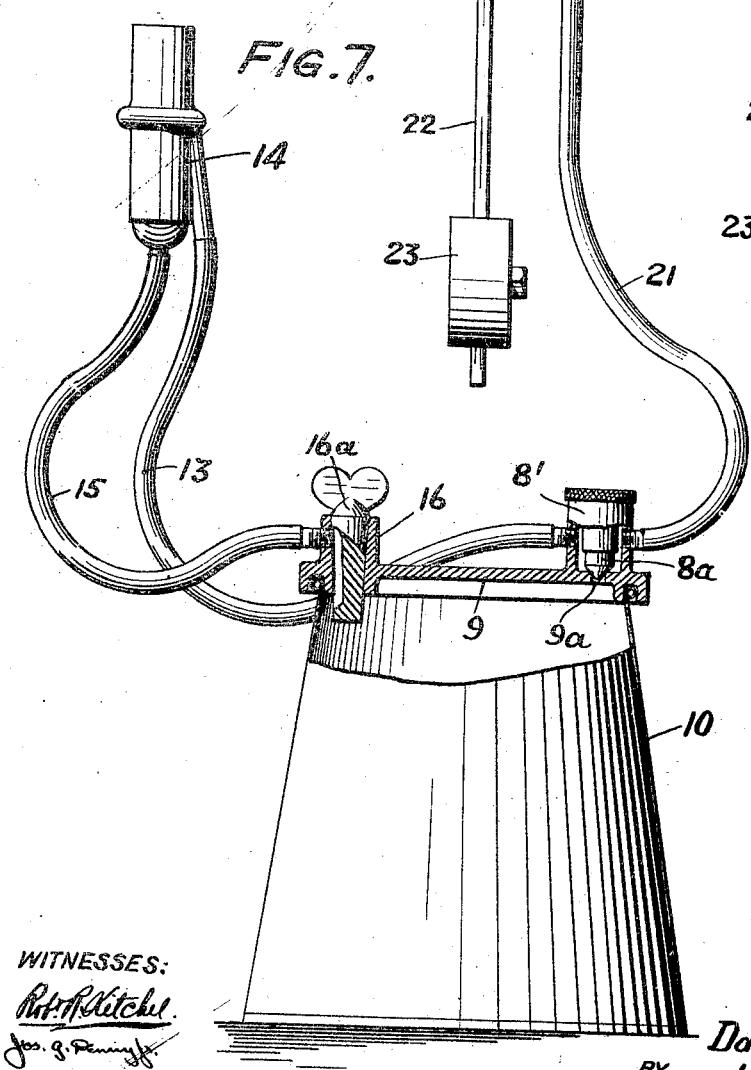

UNITED STATES PATENT OFFICE.

DAVID TOWNSEND SHARPLES, OF WEST CHESTER, PENNSYLVANIA.

MILKING APPARATUS.

994,956.  Specification of Letters Patent.   Patented June 13, 1911.

Application filed June 6, 1910. Serial No. 565,336.

*To all whom it may concern:*

Be it known that I, DAVID T. SHARPLES, a citizen of the United States, residing at West Chester, in the county of Chester and State of Pennsylvania, have invented an improved Milking Apparatus, of which the following is a specification.

My invention relates to milking apparatus, of the pneumatic type, and it is designed to provide improved means for effecting a desired pulsating action, the improvements comprising a valve mechanism operated by a pendulum for effecting the pulsations.

In the apparatus, in its preferred form, a suction duct, the atmosphere and a pressure duct are connected successively with a compartment of a teat cup surrounding the flexible wall of an interior compartment with which the suction duct is connected through a milk receiver, the successive connections being effected by the valve mechanism oscillated by the pendulum.

The mechanism has the advantage of providing the desired pulsatory action, variable in its time with variations in the distance of the center of gravity of the pendulum from the center of oscillation.

In the drawings, Figure 1 is a sectional elevation of apparatus embodying my improvements; Fig. 2 is a sectional elevation of the same viewed at right angles to the position shown in Fig. 1; Fig. 3 is an enlarged sectional view taken on the line 3—3 of Fig. 1; Fig. 4 is a sectional view taken on the line 4—4 of Fig. 3; Fig. 5 is a sectional view taken on the line 5—5 of Fig. 4; Fig. 6 is a sectional view taken on the line 6—6 of Figs. 4 and 5; Fig. 7 is a sectional side elevation representing a modified construction, and Fig. 8 is an end elevation of the pulsator shown in Fig. 7.

In the apparatus, a pressure pipe 1 and a vacuum pipe 2 have connected therewith a valve body 3 provided with the seats $3^a$ and $3^b$, for engaging the pipes, and the threaded socket $3^c$ in which is engaged the threaded end $4^a$ of a hanger 4, the parts being clamped together by a clip 5 sleeved on the hanger in contact with the pipes and a nut 6 screwed down on the threaded end $4^a$ against the clip.

The valve body has the passage $3^d$ connecting its port $3^e$ with the duct 1, the passage $3^f$ connecting its port $3^g$ with the duct 2, and the cylindrical journal bearing $3^h$ connected by the port $3^i$ with the atmosphere.

A cylindrical valve 7 is provided with a cylindrical sleeve $7^a$ which is journaled in the bearing $3^h$ of the body. The sleeve is held in position by an oil soaked felt washer $7^b$ secured to an end of the part 7 and overlapping the end of the sleeve, the washer serving to clean and lubricate the bearing in which the sleeve is journaled and with reference to which it is adapted to be withdrawn and inserted.

In the form of the invention illustrated in Figs. 1 to 6 inclusive, the valve 7 is fixed to a casing 8 on the cover 9 of the receptacle 10. A passage $7^c$, in the valve, connects the port $7^d$ of the sleeve $7^a$ with the chamber of the casing 8, which is connected through the port $9^a$ in the cover 9 with the interior of the receptacle 10, the port $9^a$ being controlled by a puppet valve $8^a$ movable in the guiding barrel $8^b$ in the casing 8. The port $7^d$ is brought into registration with the ports $3^e$, $3^i$ and $3^g$, alternately, by the oscillation of the receptacle 10. To regulate the operation, the sleeve is adjustable upon the part 7 by means of a flange $7^f$ having a rack $7^g$ and a screw 11 journaled in the bearing 12 on the casing 8, the screw having the thread $11^a$ which engages the rack.

The casing 8 has its chamber connected by the flexible tube 13 with the exterior chamber $14^a$ of a teat cup 14, which has its interior chamber $14^b$ connected by the flexible tube 15 with a valve casing 16 communicating with the interior of the pail 10, the casing 16 having a valve $16^a$ therein for controlling the communication between the pail and the inner chamber of the teat cup.

A duct 17, controlled by the valve $17^a$, connects the interior of the casing 8 with a motor cylinder 18 on the cover 9. A piston 19 acts in the cylinder and is adapted to make contact with the lug 20 fixed to the body 1.

In operation, the pail 10 is elevated and the valve 7 is slipped into the bearing $3^h$. Then the screw 11 is revolved and the valve sleeve $7^a$ is turned on its arbor to bring its port $7^d$ into registration with the port $3^g$ with the pail in the vertical position. The suction duct 2 now communicates through the passages $3^f$ and $7^c$ with the casing of the chamber 8; and thence with the teat cup compartment 14ª through the duct 13, and with the teat cup compartment 14ᵇ through the port 9ª, pail 10, open valve casing 16 and duct 15. The cup is now applied to the teat and the screw 11 is adjusted to bring the port 7ᵈ to the central position, in registration with the port 3ⁱ, upon which atmospheric pressure is admitted to the outer chamber of the teat cup while the vacuum is maintained in the inner chamber, the valve 8ª closing the port 9ª on the admission of air to the casing 8. The pail is now caused to pendulate by swinging it from the vertical position. When the oscillating action effects the registration of the ports 3ᵉ and 7ᵈ, pressure from the duct 1 is communicated to the outer chamber of the teat cup through the parts 3ᵈ, 7ᶜ, 8 and 13; the valve 8ª remaining down to maintain the vacuum in the pail 10, duct 15 and the inner chamber of the teat cup. When the pail returns to the vertical position, bringing the ports 3ⁱ and 7ᵈ into registration, the vacuum is maintained in the inner chamber of the teat cup and atmospheric pressure is admitted to the outer chamber thereof as previously described. When the movement of the pail effects the registration of the ports 3ᵍ and 7ᵈ, suction is communicated from the duct 2 to the outer compartment of the teat cup, as previously described, the desired vacuum in the inner compartment of the teat cup being maintained by the lifting of the valve 8ª and suction through the uncovered port 9ª. The pendulation of the receptacle is maintained by the motor having the cylinder 18 and piston 19 connected with the casing 8 by the duct 17. With the valve 17ª set to open this duct to the desired degree and the ports 3ᵉ and 7ᵈ in registration, compressed air enters the cylinder 18, lifts the piston 19 (which makes contact with the lug 20) and swings the pail away from the lug, the return being effected by gravity.

In the form of the invention illustrated in Figs. 7 and 8, the valve 7 has its passage 7ᶜ connected by a flexible tube 21 with the casing 8' on the cover 9 of the pail 10, and the valve is oscillated by a pendulum 22 fixed thereto and provided with an adjustable weight 23 by which the periodicity of the pulsator can be varied. An arm 24 on the pendulum carries the cylinder 18' containing the piston 19 adapted to make contact with the stationary lug 20, the cylinder being connected by the passage 17' with the passage 7ᶜ.

The operation is similar to that previously described, the screw 11 being first revolved and acting through the flange 7ᶠ to adjust the sleeve 7ª so that the suction duct 2 shall be connected through the tube 21 with the casing 8' when the pendulum 22 is in the vertical position. Suction is thus applied to the outer chamber of the teat cup 14 through the tube 13 and to the inner chamber of the teat cup through the port 9ª (controlled by the valve 8ª), pail 10, valve-casing 16 (controlled by the valve 16ª) and tube 15. The cup is now placed on the teat, the screw 11 is turned to effect communication between the atmosphere and the outer chamber of the teat cup, the pendulum is started and the outer teat cup chamber is connected sequentially with the pressure pipe 1, the atmosphere and the suction pipe 2, the movement being maintained by the motor.

Having described my invention, I claim:

1. In a milking apparatus, a pulsator comprising a valve, a pendulating device for oscillating said valve, a teat cup, and means for connecting said teat cup and valve.

2. In a milking apparatus, a teat cup, a suction conduit, a pressure conduit, and mechanism comprising a pendulating device adapted for connecting a compartment of said teat cup with said suction and pressure conduits alternately.

3. In a milking apparatus, in combination with a suction conduit and a pressure conduit, valve mechanism adapted for communicating with said conduits, valve mechanism journaled relatively to said valve mechanism first named and adapted to coöperate therewith, and a receptacle supported by said second named valve mechanism and adapted to communicate therewith, said valve mechanism being operated by the oscillation of said receptacle.

4. In a milking apparatus, a valve body, a valve journaled therein, and a receptacle suspended from said valve, said valve body and valve having ports adapted to be moved into and out of registration by the oscillation of said receptacle.

5. In a milking apparatus, a valve body having a pressure passage and a suction passage, a journaled valve having a passage adapted for registration with said pressure passage and suction passage alternately, a receptacle adapted for communicating with the passage of said journaled valve, a valve for controlling the communication between said receptacle and the passage of said journaled valve, and a teat cup having a compartment communicating with the passage of said journaled valve.

6. In a milking apparatus, in combination with a suction duct and a pressure duct, means provided with passages communicating with said ducts and a passage communicating with the atmosphere, a journaled valve having a passage adapted to be brought into communication with the respective passages of said means, a receptacle adapted to communicate with the passage of and to oscillate said journaled valve, and a valve for controlling the communication between said receptacle and the passage of said valve.

7. In a milking apparatus, in combination with a suction duct and a pressure duct, means provided with passages communicating with said ducts and the atmosphere, a journaled valve having a passage adapted to be brought into communication with the respective passages of said means, and a teat cup having a compartment communicating with the passage of said valve.

8. In a milking apparatus, a journal bearing having passages therein, an arbor, a sleeve adjustable on said arbor and having a port adapted to register with said passages successively upon the oscillation of said arbor, and a pendulating device connected with and supported by said arbor.

9. In a milking apparatus, a journal bearing containing passages, an arbor, a sleeve adapted to turn on said arbor, said sleeve being journaled in said bearings and having a port adapted for registration with said passages, means for turning said sleeve on said arbor to adjust the position of said port, a receptacle supported by and adapted for rocking said arbor with the sleeve thereon, a conduit connecting said port and receptacle, and a valve for controlling said conduit.

10. In a milking apparatus, a pressure duct, a suction duct, a bearing having passages communicating with the respective ducts and a passage communicating with the atmosphere, a sleeve journaled in said bearing, said sleeve having a port movable into registration with the respective passages, an arbor on which said sleeve is adapted to turn, said arbor having a passage communicating with said port, means for turning and holding said sleeve with relation to said arbor, a pail, means comprising a chamber connecting said pail with the passage through said arbor, an automatic valve for preventing the communication of pressure from said chamber to said pail, and a teat cup having an inner compartment connected with said pail and an outer compartment communicating with said chamber.

11. In a milking apparatus, a pulsating mechanism, a pendulating member for operating said mechanism, and a motor for operating said pendulating member.

12. In a milking apparatus, a pressure pipe, valve mechanism connected with said pipe, a pendulating member connected with said valve mechanism, a cylinder, a piston in said cylinder, a conduit connecting said cylinder with said valve mechanism, and means for engaging said piston, whereby pressure is periodically communicated from said pipe to said cylinder and said member is caused to pendulate through the engagement of said piston with said means.

13. In a milking apparatus, a valve mechanism comprising a journal bearing and a journal adapted to be inserted in and withdrawn from said bearing by moving said journal longitudinally, in combination with a pendulating receptacle suspended from said journal and communicating with said valve mechanism.

14. In a milking apparatus, a pressure duct, a suction duct, a valve mechanism, a conduit connected alternately with said suction and pressure ducts by said valve mechanism, a receptacle connected with and adapted to be exhausted through said conduit and a teat cup having a chamber connected with and adapted to be exhausted through said receptacle and conduit, said teat cup having a second chamber connected with said conduit.

15. In a milking apparatus, a pressure duct, a suction duct, a receptacle, a conduit connected with said receptacle, an oscillating valve having means for connecting said conduit with said ducts alternately; valve mechanism for preventing the communication of pressure and permitting the application of suction from said conduit to said receptacle, and a teat cup having a chamber connected with said conduit.

In witness whereof I have hereunto set my name this 1st day of June, 1910, in the presence of the subscribing witnesses.

DAVID TOWNSEND SHARPLES.

Witnesses:
 H. B. CARLISLE,
 A. C. MACARTNEY